(No Model.) 2 Sheets—Sheet 1.
G. H. WEBB.
MACHINE FOR TAPPING NUTS.
No. 284,695. Patented Sept. 11, 1883.
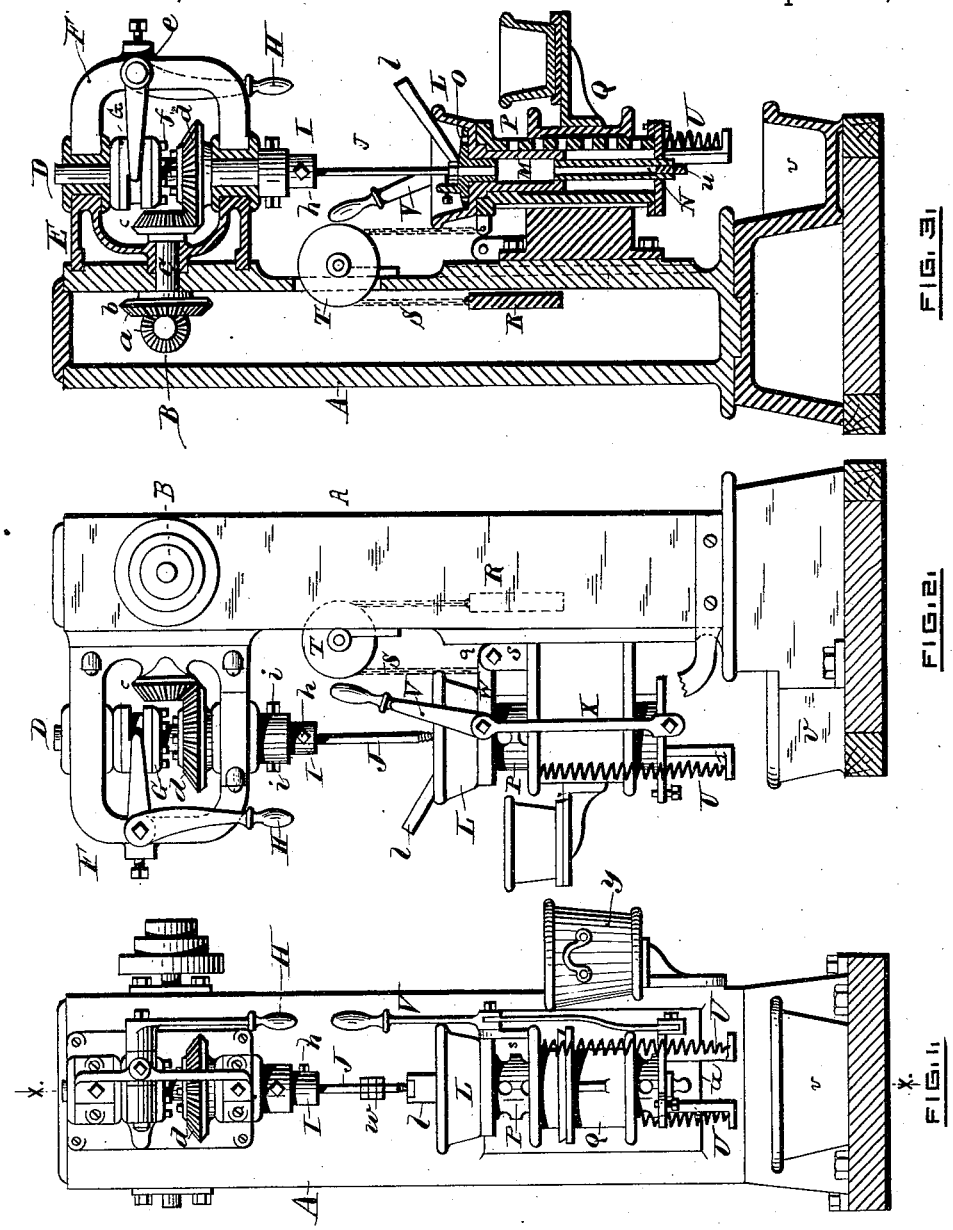
WITNESSES:
INVENTOR:
George H. Webb

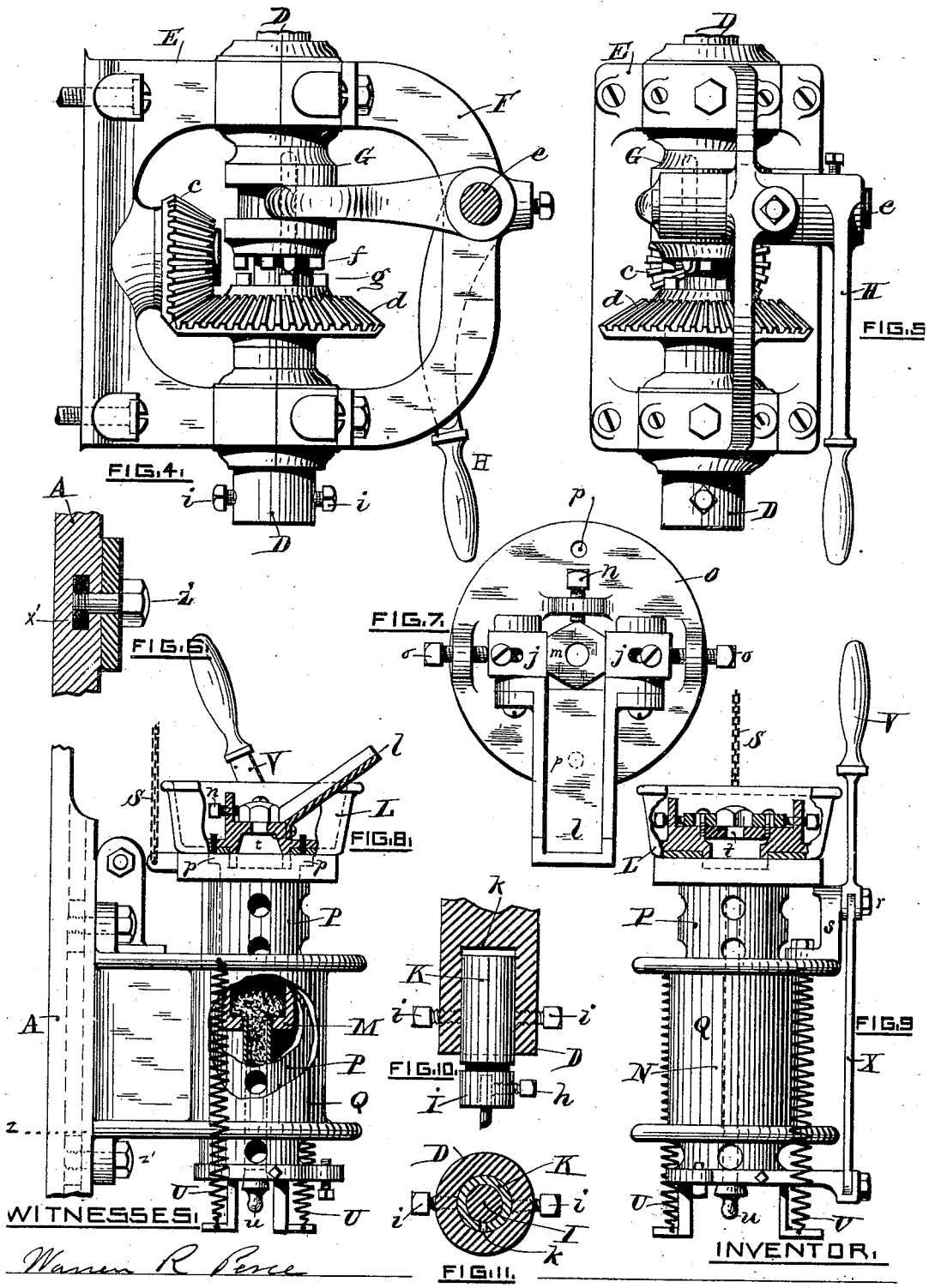

UNITED STATES PATENT OFFICE.

GEORGE H. WEBB, OF PAWTUCKET, RHODE ISLAND.

MACHINE FOR TAPPING NUTS.

SPECIFICATION forming part of Letters Patent No. 284,695, dated September 11, 1883.

Application filed April 21, 1883. (No model.)

*To all whom it may concern:*

Be it known that I, GEORGE H. WEBB, of Pawtucket, in the county of Providence, in the State of Rhode Island, have invented a new and useful Improvement in Machines for Tapping Nuts; and I declare the following to be a specification thereof, reference being had to the accompanying drawings.

Like letters indicate like parts.

Figure 1 is a front elevation of my improved tapping-machine. Fig. 2 is a side elevation of the same. Fig. 3 is a vertical section of the machine on the line $x\ x$ of Fig. 1. Fig. 4 is a side elevation of the gearing and appurtenances for revolving the spindle and tap. Fig. 5 is a front elevation of the same. Fig. 6 is a detail view. Fig. 7 is a top plan of the nut-holder and oil-tank. Figs. 8 and 9 are respectively a side and front elevation of the nut-holder and oil-tank, partly in section. Fig. 10 is an elevation of the bushing within the spindle to hold the tap-socket. Fig. 11 is a transverse section of the same in position.

My invention relates to machines for tapping nuts to form the screw-thread therein; and it consists, first, of a vertically-traveling oil-tank and nut-holder wherein the nut is kept submerged in oil during the operation of tapping; secondly, in the use of a split bushing fitting within the spindle and holding by friction only the collet which carries the tap, so that if the tap is obstructed in its rotation the bushing turns on the shank of said collet and avoids the breakage which a rigid connection at that place would cause; and, thirdly, in the detail construction of certain parts of the machine, as specifically pointed out in the claims.

A is the frame of the machine, and B B the main driving-shafts of the same. Power is communicated from the main shaft B by the bevel-gears $a\ b\ c$ and shaft C and turns the spindle D by the engagement of the bevel-gears $c\ d$. Said spindle D is supported by the head-stock E and cap F. A sleeve, G, having a limited vertical motion upon the spindle D by a spline within a slot thereof, (shown in dotted lines in Figs. 4 and 5,) is operated by a lever or handle, H, pivoted at $e$, and has a series of clutches, $f$, which can be thrown into or out of engagement with the clutches $g$ of the bevel-gear $d$ by the handle H. As the gear $d$ is loose upon the spindle D, while the sleeve G turns with the spindle D by its connection therewith through the slot, said spindle is revolved whenever the clutches $f\ g$ engage, but does not revolve when said clutches are disengaged. The inner end of the lever H fits in a circumferential groove of the sleeve G, and thus communicates to it the vertical movements, while not interfering with its rotation.

The spindle D carries the collet I, to which the tap J is fastened by the screw $h$. The shank of the collet I is not held fixedly, as heretofore, within the socket of the spindle D, but is held by the bushing K, which is split longitudinally, as shown at $k$. By means of the screws $i\ i$ the required degree of friction can be produced upon the shank of the collet I to hold it firmly enough to properly turn the tap J; but when the tap J for any cause is obstructed in its rotation, the collet I, being temporarily unable to revolve with the spindle D, overcomes its friction-bearing in the bushing K and remains stationary during such obstruction, although the spindle D continues its revolution, as before. By this arrangement of a bushing, acting frictionally upon the shank of the collet I, I entirely avoid the breakage of the tap, which is liable to occur in machines of common construction.

A tank, L, having a tubular extension, M, and pipe N, (see Figs. 3 and 8,) serves to contain the oil and the nut-holding device. The nut-holder is contained in the tank L, and consists of a trough, $l$, down which the nut $m$ slides by its own weight, being adjusted relatively to the tap by the guide-plates $j\ j$ and the screw $n$. Said guides $j\ j$ are adjusted by the screws $o\ o$, as shown in Fig. 7. The base O of said nut-holding device rests within the tank L, and is fastened thereto by the pins $p$. The tubular extension M of the tank L fits within the sleeve P, which slides vertically within the tubular bracket Q. Such vertical motion is caused by the weight R, connected to a lug on the back of the tank L by a chain, S, passing over a pulley, T, and also by the spiral springs U U. The spiral springs U U are fastened at the bottom to projections from the sleeve P, and at the top to the upper rim of the tubular bracket Q. The bent lever or handle V W, having its fulcrum at $q$ on the frame A, operates a connecting-rod, X, which is connected thereto by the pivot $r$, and to the upright post $s$ of the upper rim of the tubular bracket Q. As the handle V is pushed back, it relieves by a movement of the rod X the tension of the springs U U, which, with the co-operation of the weight R, cause the sleeve P to rise and lift its contained tank L M N, and when the handle V is drawn toward the workman it forces by the rod X the sleeve P down again, raising the weight R and stretching the springs U U, as before. The purpose of the perforations in the sleeve P, as shown in Figs. 3, 8, and 9, is simply to lessen its weight. The tank L M N is kept full of oil, and the chips or waste cut from the nut $m$ by the drilling of the tap J drop down through the central aperture, $t$, of the base O of the nut-holder and sink to the bottom of the tank, (see Fig. 8,) whence they are removed at intervals by withdrawing the plug $u$ from the tube N, the oil flowing out at the same time into the trough $v$, from which it is returned to the tank again by buckets, and the waste material is left in the trough $v$, to be removed at convenience.

The operation of the machine is as follows: The workman draws toward himself the handle V, thereby causing the tank and nut-holder to descend. He feeds a nut, $m$, into the trough $l$, and the nut slides down to a position directly under the tap J. He then pushes back the handle V, which causes the tank and nut-holder to rise as far as the contact of the tap J with the nut $m$ will allow, and said tank and nut-holder continue to rise by the action of the weight R and springs U U as fast as the tap works through the nut. After a nut is tapped, the tank and holder are again depressed, and another nut is fed to the machine and worked, as before described. The nuts, after being tapped, are forced up on the tap, as shown at $w$ in Fig. 1, by the next nut undergoing the operation. To remove the nuts after tapping, he pushes back the handle H, which unships the clutches $f$ $g$ and stops the further revolution of the spindle D, collet I, and tap J. The tap is then removed by unscrewing $h$, and the nuts are removed from the tap and are put in the pail $y$ or other receptacle. The tap is again fastened to the collet, and the clutches $f g$ are once more engaged by the handle H. It will be seen that by this arrangement the nut is kept constantly submerged in oil during the operation of tapping, causing a perfect lubrication of the cutting-edges of the tap during the process, whereas if the oil drops upon the work from a tank above, in the manner heretofore common, the lubrication is less complete and constant and the waste of oil is considerable.

The bracket Q is adjustable vertically, as shown in Figs. 6 and 8, Fig. 6 being a horizontal section on line $z$ of Fig. 8. The frame A is slotted vertically, as shown at $x'$. A set-screw, $z'$, secures the bracket Q at any desired position. The purpose of this adjustment is to raise the nut-holder, &c., so that a shorter tap J may be used when desired. If a small bore tap were made of the same length as those of large size, it would not be sufficiently strong to endure the twisting-strain; but by bringing the nut-holder upward, a short tap may be used and the holder adjusted thereto.

I claim as a novel and useful invention and desire to secure by Letters Patent—

1. In a nut-tapping machine, a collet carrying a tap and held within a spindle by friction, substantially as and for the purpose specified.

2. The combination of the split bushing K, the collet I, and the screws $i$ $i$, substantially as and for the purpose specified.

3. In a nut-tapping machine, a vertically-traveling oil-tank containing a nut-holding device submerged in oil and presenting a nut to the operation of a tap, substantially as specified.

4. The combination of the oil-tank L and a nut-holding device consisting of the base O, guides $j$ $j$, adjusting-screw $u$, trough $l$, and pins $p$, substantially as shown.

5. In a nut-tapping machine, the oil-tank L, having the extension M, the pipe N, and the detachable plug $u$, substantially as described.

6. The combination of the oil-tank L M, the sleeve P, and the bracket Q, substantially as specified.

7. The combination of the levers V W, the rod X, the sleeve P, the springs U U, the weight R, the chain S, and the pulley T, substantially as and for the purpose specified.

8. In a nut-tapping machine, the vertically-adjustable bracket Q, in combination with the slotted frame A, oil-tank, and nut-holder, substantially as shown, and for the purpose specified.

GEORGE H. WEBB.

Witnesses:
GEORGE H. FOWLER,
WARREN R. PERCE.